May 12, 1925.  
O. A. PETERS  
1,537,188

PRESSURE RELEASE VALVE

Filed July 21, 1923

INVENTOR  
Otto A. Peters.

Patented May 12, 1925.

1,537,188

UNITED STATES PATENT OFFICE.

OTTO A. PETERS, OF WICHITA FALLS, TEXAS.

PRESSURE-RELEASE VALVE.

Application filed July 21, 1923. Serial No. 652,998.

*To all whom it may concern:*

Be it known that I, OTTO A. PETERS, a citizen of the United States, residing at Wichita Falls, in the county of Wichita and State of Texas, have invented new and useful Improvements in Pressure - Release Valves, of which the following is a specification.

The invention relates to a pressure release valve comprising a cylindrical member provided with internal longitudinal guides. A threaded member having a spider at the top thereof is attached to the bottom of the cylindrical member. A slidable valve is seated on the top of the threaded member. Apertures are arranged in the slidable valve and having an apertured disc slidably mounted thereon.

The object of the invention is to provide a pressure release valve especially designed to be used on petroleum storage tanks for the purpose of releasing the excess pressure created by evaporation.

Another object of the invention is to provide a device of this nature that will release the vacuum when the oil is being drawn off.

A further object of the invention is to provide a pressure release valve that is very simple and practical and can be manufactured and sold at a very nominal cost.

The nature and advantages of the invention will be better understood when the following detail description is read in connection with the accompanying drawing forming a part of this application. The invention residing in the construction, combination and arrangement of parts as claimed.

Figure 1:
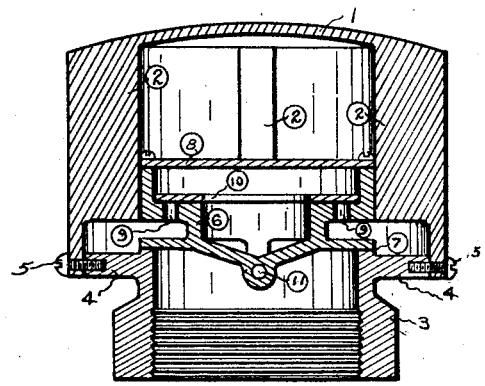

In the accompanying drawing the various parts will be referred to by numbers. And, wherein, Figure 1 is a side sectional view.

Figure 2:
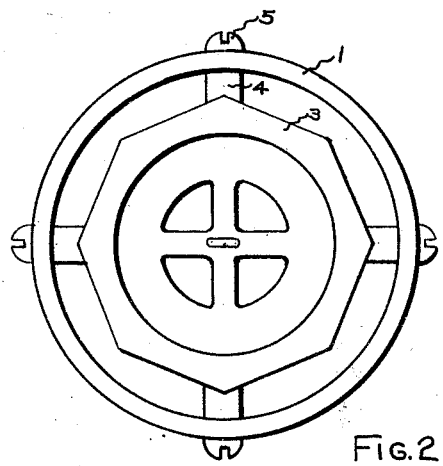

Figure 2 is a bottom plan view.

The device forming the subject matter of this invention comprises a cylindrical member 1. 2 are longitudinal guides arranged in the cylindrical member 1. 3 is a threaded connection having a spider arranged at the top thereof, as shown at 4. The cylindrical member 1 is attached to the spider 4 with screws, as illustrated at 5. 6 is a slidable valve arranged between the guides 2 and seated on the threaded connection 3, as shown at 7. 8 is a solid disk attached to the top of the slidable valve 6. 9 are apertures arranged in the slidable valve 6. 10 is an apertured disc slidably mounted over the apertures 9. 11 is an apertured member forming a part of the slidable valve 6 for the purpose of hanging weights thereon to adjust the pressure which is desired to be maintained.

The release valve operates in the following manner: The pressure accumulating in the threaded connection 3 will raise the slidable valve 6 and allow the pressure to escape. When the fluid in a tank is being drawn off the vacuum created thereby will raise the apertured disc 10 and admit air through the apertures 9.

While it is believed from the foregoing description the nature and advantages of the invention will be readily apparent, I desire to have it understood that I do not limit myself to what is herein shown and described, and that such changes may be resorted to, when desired, as fall within the scope of what is herein claimed.

What I claim is:

1. A release valve of the character described, comprising a cylinder, a spider connection attached to said cylinder, a valve seated on said spider connection, an apertured member in said valve, a disc slidably mounted on said apertured member.

2. An article of manufacture comprising a cylindrical member having internal longitudinal guides, a threaded connection having a spider at the top thereof, attached to said cylindrical member, a slidable valve seated on said threaded connection, apertures in said slidable valve, a disc slidably mounted on said apertures.

OTTO A. PETERS.